United States Patent
Wilson et al.

(10) Patent No.: US 10,738,210 B2
(45) Date of Patent: *Aug. 11, 2020

(54) INK

(71) Applicant: Fujifilm Imaging Colorants, Inc., New Castle, DE (US)

(72) Inventors: Eda Wilson, New Castle, DE (US); Emmanuel Dimotakis, New Castle, DE (US)

(73) Assignee: Fujifilm Imaging Colorants, Inc., New Castle, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/342,311

(22) PCT Filed: Sep. 25, 2017

(86) PCT No.: PCT/GB2017/052858
§ 371 (c)(1),
(2) Date: Apr. 16, 2019

(87) PCT Pub. No.: WO2018/073560
PCT Pub. Date: Apr. 26, 2018

(65) Prior Publication Data
US 2020/0048488 A1  Feb. 13, 2020

Related U.S. Application Data

(60) Provisional application No. 62/410,509, filed on Oct. 20, 2016.

(51) Int. Cl.
| | | |
|---|---|---|
| C09D 11/40 | (2014.01) | |
| B41J 3/407 | (2006.01) | |
| B41M 5/00 | (2006.01) | |
| C09D 11/033 | (2014.01) | |
| C09D 11/037 | (2014.01) | |
| C09D 11/102 | (2014.01) | |
| C09D 11/108 | (2014.01) | |
| C09D 11/322 | (2014.01) | |
| C09D 11/38 | (2014.01) | |

(Continued)

(52) U.S. Cl.
CPC ............ *C09D 11/40* (2013.01); *B41J 2/2107* (2013.01); *B41J 3/4078* (2013.01); *B41M 5/0023* (2013.01); *B41M 5/0047* (2013.01); *C09D 11/033* (2013.01); *C09D 11/037* (2013.01); *C09D 11/102* (2013.01); *C09D 11/108* (2013.01); *C09D 11/322* (2013.01); *C09D 11/38* (2013.01); *D06P 5/30* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 25/001; B41J 25/34; B41J 25/003; B41J 25/312; B41J 2025/008; B41J 2202/21; B41J 2/17596; B41J 2/16508; B41J 2/1652; B41J 2/16538; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106

See application file for complete search history.

(56) References Cited

U.S. PATENT DOCUMENTS

| | | |
|---|---|---|
| 5,542,969 A | 8/1996 | Hirasa et al. |
| 5,667,569 A | 9/1997 | Fujioka |
| 5,738,714 A | 4/1998 | Hirasa et al. |

(Continued)

FOREIGN PATENT DOCUMENTS

| | | |
|---|---|---|
| EP | 0877065 A1 | 11/1998 |
| EP | 1914281 A1 | 4/2008 |

(Continued)

*Primary Examiner* — Manish S Shah
(74) *Attorney, Agent, or Firm* — Banner & Witcoff, Ltd.

(57) ABSTRACT

An aqueous ink including: from 0.1 to 8 parts by weight of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups; from 10 to 25 parts by weight of a first solvent selected from one or more of the group consisting of ethylene glycol, propylene glycol, dipropylene glycol and triethylene glycol; from 2 to 10 parts by weight of a second solvent selected from one or more of the group consisting of 2-pyrrolidone, N-methyl-2-pyrrolidone, N-ethyl-2-pyrrolidone, N-cyclohexyl-2-pyrrolidone and N,N-dimethylacetamide; from 20 to 45 parts by weight of glycerol; from 4 to 12 parts by weight of a styrene butadiene latex binder and/or a polyurethane latex binder; from 0.1 to 2 parts by weight of an acetylenic surfactant; from 0 to 2 parts by weight of 1,2-benzisothiazolin-3-one; and the balance to 100 parts by weight water. Also ink-jet printing processes, printed materials, ink containers and ink-sets.

16 Claims, No Drawings

(51) Int. Cl.
*D06P 5/30* (2006.01)
*B41J 2/21* (2006.01)

(56) References Cited

U.S. PATENT DOCUMENTS

| | | | |
|---|---|---|---|
| 6,004,389 A | 12/1999 | Yatake | |
| 6,087,416 A | 7/2000 | Pearlstine et al. | |
| 6,328,393 B1 | 12/2001 | Lin et al. | |
| 6,478,862 B1 | 11/2002 | Elwakil | |
| 6,488,751 B1 | 12/2002 | Takemoto | |
| 6,491,748 B2 | 12/2002 | Watanabe | |
| 6,598,967 B1 | 7/2003 | Chen et al. | |
| 6,602,333 B2 | 8/2003 | Miyabayashi | |
| 6,644,799 B2 | 11/2003 | Han-Adebekun et al. | |
| 6,679,598 B2 | 1/2004 | Kato et al. | |
| 6,713,531 B2 | 3/2004 | Iijima | |
| 6,715,869 B1 | 4/2004 | Reem et al. | |
| 6,805,735 B2 | 10/2004 | Taniguchi et al. | |
| 6,848,777 B2 | 2/2005 | Chen et al. | |
| 6,878,197 B2 | 4/2005 | Chen et al. | |
| 6,886,931 B2 | 5/2005 | Yatake | |
| 6,908,188 B2 | 6/2005 | Reczek et al. | |
| 6,953,613 B2 | 10/2005 | Reem et al. | |
| 7,160,376 B2 | 1/2007 | Watanabe et al. | |
| 7,201,794 B2 | 4/2007 | Ito et al. | |
| 7,247,198 B2 | 7/2007 | Fujioka et al. | |
| 7,264,664 B2 | 9/2007 | Kamoto et al. | |
| 7,284,851 B2 | 10/2007 | Bannai et al. | |
| 7,354,476 B2 | 4/2008 | Beach et al. | |
| 7,497,563 B2 | 3/2009 | Rehman | |
| 7,578,876 B2 | 8/2009 | Nakajima et al. | |
| 7,686,444 B2 | 3/2010 | Sugimoto et al. | |
| 7,714,076 B2 | 5/2010 | Krepski et al. | |
| 7,717,993 B2 | 5/2010 | Kanaya | |
| 7,812,068 B2 | 10/2010 | Habashi et al. | |
| 7,922,316 B2 | 4/2011 | Bannai et al. | |
| 7,955,426 B2 | 6/2011 | Kanaya | |
| 8,114,923 B2 | 2/2012 | Sarkisian et al. | |
| 8,187,371 B2 | 5/2012 | Brust et al. | |
| 8,403,461 B2 | 3/2013 | Hara et al. | |
| 8,434,857 B2 | 5/2013 | Falkner et al. | |
| 8,690,308 B2 | 4/2014 | Boris et al. | |
| 9,127,178 B2 | 9/2015 | Cordwell et al. | |
| 9,187,667 B2 | 11/2015 | Doumaux et al. | |
| 9,267,044 B2 | 2/2016 | Annable et al. | |
| 9,309,425 B2 | 4/2016 | Popat et al. | |
| 9,969,895 B2 | 5/2018 | Double et al. | |
| 10,190,008 B2 | 1/2019 | Oriakhi et al. | |
| 10,557,048 B2 * | 2/2020 | Oriakhi | B41J 2/18 |
| 2008/0002004 A1 | 1/2008 | O'Donnell et al. | |
| 2011/0014439 A1 * | 1/2011 | Joshi | C09D 11/322 428/195.1 |
| 2012/0212536 A1 * | 8/2012 | Saito | B41J 2/2107 347/16 |
| 2016/0032118 A1 | 2/2016 | Morris et al. | |
| 2017/0362450 A1 | 12/2017 | Oriakhi et al. | |
| 2018/0237651 A1 | 8/2018 | Oriakhi et al. | |
| 2018/0305863 A1 | 10/2018 | Dimotakis et al. | |

FOREIGN PATENT DOCUMENTS

| | | |
|---|---|---|
| EP | 2090627 A1 | 8/2009 |
| JP | 2004195706 A | 7/2004 |
| WO | 2001/044326 A1 | 6/2001 |
| WO | 2008/042320 A1 | 4/2008 |
| WO | 2009/115831 A1 | 9/2009 |
| WO | 2011/074167 A1 | 6/2011 |
| WO | 2012/085541 A2 | 6/2012 |
| WO | 2012/153119 A1 | 11/2012 |
| WO | 2012/153120 A1 | 11/2012 |
| WO | 2016/092309 A1 | 6/2016 |

* cited by examiner

INK

RELATED APPLICATIONS

This application is a National Stage Application under 35 U.S.C. 371 of PCT application PCT/GB2017/052858 designating the United States and filed Sep. 25, 2017; which claims the benefit of U.S. provisional application No. 62/410,509 and filed Oct. 20, 2016 each of which are hereby incorporated by reference in their entireties.

This invention relates to inks, ink-sets, a process for ink-jet printing, ink-jet ink containers and ink-jet printers.

Ink-jet printing is a non-impact printing technique in which droplets of an ink are ejected through fine nozzles onto a substrate without bringing the nozzles into contact with the substrate. There are basically three types of ink-jet printing:

i) Continuous ink-jet printing uses a pressurized ink source that produces a continuous stream of ink droplets from a nozzle. The droplets of ink are directed either thermally or by electrostatic means at a nominally constant distance from the nozzle. Those droplets which are not successfully deflected are recycled to the ink reservoir via a gutter.

ii) Drop-on-demand ink-jet printing where the ink is stored in a cartridge and fired from the print-head nozzle using a pressurization actuator (usually thermal or piezoelectric). With drop-on-demand printing only the drops that are required for printing are produced.

iii) Single pass ink-jet printing where the ink is fired by a print-head with hundreds and in some cases thousands of nozzles arranged at a high density on a face plate (also known as a nozzle plate) during a single-pass of the print-head over the substrate. These print-heads are used in industry where a high volume throughput is required. Single-pass print-heads may rely on ink being fed directly to the print-head from an ink storage container or they may be an ink re-circulating single-pass print-head. In ink re-circulating single-pass print-heads the ink is continuously re-circulated in the print-head and (as in drop-on demand printing) only drops required for printing are drawn off to the nozzle.

Each of these types of ink-jet printing presents unique challenges. Thus, in continuous ink-jet printing ink active solvent monitoring and regulation is required to counter solvent evaporation during the time of flight of droplets which are ejected from the nozzle, but which do not give rise to a printed image (i.e. the time between nozzle ejection and gutter recycling), and from the venting process whereby excess air (drawn into the reservoir when recycling unused drops) is removed.

In drop-on demand printing the ink may be kept in the cartridge for long periods when it can deteriorate and form precipitates which can, in use, block the fine nozzles in the print-head. This problem is particularly acute with pigment inks where the suspended pigment particles can settle out.

Ink formulation for all forms of ink-jet printing is extremely demanding. It is especially difficult to formulate inks, especially pigment inks given the tendency of pigments to precipitate, able to work in high speed single-pass print-heads.

To enable these printers to work at these high speeds the inks used must show a low foaming potential and rapid, excellent and consistent ink-drop formation.

Crucially the inks used in single-pass ink-jet printers should not cause face plate wetting of the print-head. Face plate wetting occurs when liquid, from an aqueous ink, adheres to the face plate and interferes with the jetting from one or more of the nozzles in the face plate. In an industrial process this can be catastrophic since it can result in an unwanted white line appearing throughout the print output. This can lead to a complete failure of the print run with the output being discarded and the process stopped so the print-head can be cleaned. This problem is particularly acute when a low temperature film-forming latex is included in the ink or printed through the print-head.

Historically, all print-heads have been binary, that is, they've produced droplets of a single predetermined size. Where small drops give good definition and high resolution and larger drops are able to cover large areas. However, greyscale print-heads, which can produce multiple drop sizes, are increasingly being used and these print-heads are able to deliver the benefits seen with both large and small drop volume. Producing inks able to work in these print-heads and reliably produce droplets of various volumes is an additional challenge for the ink formulation chemist.

Ink-jet printing of reactive dyes has found wide spread utility in the textile industry. However, ink-jet printing of pigment inks on textiles has been much more limited, due to the problems outlined above.

The Applicants have found that a particular type of self-dispersible pigment in combination with certain low Tg binders are able to print satisfactorily in single-pass (especially re-circulating) ink-jet printers (including greyscale print-heads) and give printed textiles which display excellent properties such as optical density, chroma, crock and wash-fastness to shade change and staining.

According to a first aspect of the present invention there is provided an aqueous ink comprising:

(a) from 0.1 to 8 parts by weight of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;

(b) from 10 to 25 parts by weight of a first solvent selected from one or more of the group consisting of ethylene glycol, propylene glycol, dipropylene glycol and triethylene glycol;

(c) from 2 to 10 parts by weight of a second solvent selected from one or more of the group consisting of 2-pyrrolidone, N-methyl-2-pyrrolidone, N-ethyl-2-pyrrolidone, N-cyclohexyl-2-pyrrolidone and N,N-dimethylacetamide;

(d) from 20 to 45 parts by weight of glycerol;

(e) from 4 to 12 parts by weight of a styrene butadiene latex binder and/or a polyurethane latex binder;

(f) from 0.1 to 2 parts by weight of an acetylenic surfactant;

(g) from 0 to 2 parts by weight of 1,2-benzisothiazolin-3-one; and (h) the balance to 100 parts by weight water.

All parts and percentages herein (unless stated otherwise) are by weight.

The self-dispersible pigment is preferably derived from any of the classes of pigments described in the Third Edition of the Colour Index (1971) and subsequent revisions of, and supplements thereto, under the chapter headed "Pigments".

Examples of suitable organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although often regarded as being inorganic, behaves more like an organic pigment in its dispersing properties and is also suitable. Preferred organic pigments are phthalocyanines, especially copper phthalocyanine pigments, azo pigments, indanthrones, anthanthrones, quinacridones and carbon black pigments.

The pigment is preferably a yellow, cyan, magenta, red, green, blue or black pigment. The pigment may be a single chemical species or a mixture comprising two or more chemical species (e.g. a mixture comprising two or more different pigments). In other words, two or more different pigments solids may be used in the process of the present invention. Preferably the pigment is a yellow, cyan, magenta, red, or black pigment More preferably the self-dispersible pigment comprises one or more of Carbon Black; Pigment Blue 15:3; Pigment Yellow 74, Pigment Yellow 155, Pigment Blue 60, Pigment Red 122 and Pigment Red 254.

The dispersant, prior to crosslinking with the crosslinking agent, preferably has an acid value of at least 125mg KOH/g.

The dispersant preferably has one or more oligomeric dispersing groups.

In order to provide water-dispersibility, the polymer-encapsulated pigment particles preferably have carboxy groups (i.e. not all of the carboxy groups in the dispersant are crosslinked to form the polymer-encapsulated pigment particles).

The polymer-encapsulated pigment particles may be prepared by crosslinking some of the carboxy groups in a carboxy-functional dispersant in the presence of a pigment and a crosslinking agent, preferably at a temperature of less than 100° C. and/or a pH of at least 6. Such crosslinking is usually performed in an aqueous medium, for example in a mixture comprising water and organic solvent. Suitable mixtures comprising water and organic solvent are as described above in relation to the ink.

Preferably, the polymer-encapsulated pigment particles have a Z-average particle size of less than 500 nm, more preferably from 10 to 400 nm and especially from 15 to 300 nm.

The Z-average particle size may be measured by any means, but a preferred method is by photo correlation spectroscopy devices available from Malvern® or Coulter®.

Preferably the carboxy-functional dispersant comprises benzyl methacrylate.

A preferred carboxy-functional dispersant is a copolymer comprising one or more hydrophobic ethylenically unsaturated monomers (preferably at least half of which by weight is benzyl methacrylate), one or more hydrophilic ethylenically unsaturated monomers having one or more carboxy groups; and optionally some or no hydrophilic ethylenically unsaturated monomers having one or more hydrophilic non-ionic groups.

An especially preferred carboxy-functional dispersant is a copolymer comprising:
(i) from 75 to 97 parts by weight of one or more hydrophobic ethylenically unsaturated monomers comprising at least 50 parts by weight of benzyl methacrylate;
(ii) from 3 to 25 parts by weight of one or more hydrophilic ethylenically unsaturated monomers having one or more carboxy groups; and
(iii) 0 to 1 part of hydrophilic ethylenically unsaturated monomers having one or more hydrophilic non-ionic groups.

Typically and the sum of the parts (i), (ii) and (iii) adds up to 100.

More preferably the carboxy-functional dispersant is a copolymer comprising:

(i) from 80 to 93 parts by weight of one or more hydrophobic ethylenically unsaturated monomers comprising at least 50 parts by weight benzyl methacrylate;
(ii) from 7 to 20 parts by weight of one or more hydrophilic ethylenically unsaturated monomers having one or more carboxy groups;
(iii) 0 to 1 part of hydrophilic ethylenically unsaturated monomers having a hydrophilic non-ionic group.

Typically and the sum of the parts (i), (ii) and (iii) adds up to 100.

Preferably the hydrophobic monomers have no hydrophilic groups, whether ionic or non-ionic. For example, they are preferably free from water-dispersing groups.

Preferably, the hydrophobic ethylenically unsaturated monomers have a calculated log P value of at least 1, more preferably from 1 to 6, especially from 2 to 6.

A review by Mannhold, R. and Dross, K. (Quant. Struct-Act. Relat. 15, 403-409, 1996) describes how to calculate log P values.

Preferred hydrophobic ethylenically unsaturated monomers are styrenic monomers (e.g. styrene and alpha methyl styrene), aromatic (meth)acrylates (especially benzyl (meth)acrylate), $C_{1-30}$-hydrocarbyl (meth)acrylates, butadiene, (meth)acrylates containing poly($C_{3-4}$)alkylene oxide groups, (meth)acrylates containing alkylsiloxane or fluorinated alkyl groups and vinyl naphthalene.

Preferably, the dispersant comprises the repeat units from copolymerising from 75 to 97, more preferably from 77 to 97, especially from 80 to 93 and most especially from 82 to 91 parts by weight of component (i).

Dispersants comprising at least 50 parts by weight of benzyl (meth)acrylate monomer repeat units can provide polymer-encapsulated pigment dispersions with good stability and good optical density.

Component (i) preferably comprises at least 60 parts, more preferably at least 70 and especially at least 75 parts by weight of benzyl (meth)acylate. The remainder required to obtain the overall preferred amounts of hydrophobic monomers may be provided by any one or more of the above hydrophobic monomers other than benzyl (meth)acrylate. Preferably, benzyl (meth)acrylate is benzyl methacrylate (rather than benzyl acrylate).

In a preferred embodiment component (i) comprises only benzyl (meth)acrylate, more preferably only benzyl methacrylate.

Preferably, the monomers in component (ii) have a calculated log p value of less than 1, more preferably from 0.99 to −2, especially from 0.99 to 0 and most especially from 0.99 to 0.5, when calculated in the un-neutralised (e.g. free acid) form.

Preferred hydrophilic ethylenically unsaturated monomers for component (ii) having one or more carboxylic acid groups include beta carboxyl ethyl acrylate, itaconic acid, maleic acid, fumaric acid, crotonic acid, more preferably acrylic acid and especially methacrylic acid. Preferably, these ethylenically unsaturated monomers when polymerised provide the only ionic groups in the dispersant.

In a preferred embodiment component (ii) is or comprises methacrylic acid.

Preferably, the dispersant comprises the repeat units from copolymerising 3 to 25, more preferably 3 to 23, especially 7 to 20 and most especially 9 to 18 parts by weight of component (ii). This is especially so when component (ii) comprises, or more preferably is, methacrylic acid.

For the purposes of the present invention a monomer having both ionic and non-ionic hydrophilic groups is considered to belong to component (iii). Thus, all the ethylenically unsaturated monomers in component (ii) are free from hydrophilic non-ionic groups.

Preferably, the monomers in component (iii) have calculated log P values of less than 1, more preferably of from 0.99 to −2.

Preferably, component (iii) is less than 1 part, more preferably less than 0.5 parts, especially less than 0.1 parts by weight and most especially 0 parts (i.e. absent). In this way the dispersant contains no repeat units from hydrophilic monomers having one or more hydrophilic non-ionic groups.

Examples of hydrophilic non-ionic groups include polyethyleneoxy, polyacrylamide, polyvinyl pyrrolidone, hydroxy functional celluloses and poly vinyl alcohol. The most common ethylenically unsaturated monomer having a hydrophilic non-ionic group is polyethyleneoxy (meth) acrylate.

In embodiments where repeat units from component (iii) are present in the dispersant (for example 1 part by weight of component (iii)) then in one embodiment the amount of component (iii) is deducted from the preferred amounts of component (i). In this way the amounts of all the components (i), (ii) and (iii) still adds up to 100. Thus for embodiments where 1 part by weight of component (iii) is present the preferred amounts of component (i) expressed above would become from 74 to 96 (75-1 to 97-1), more preferably from 76 to 96 (77-1 to 97-1), especially from 79 to 92 (80-1 to 93-1) and most especially from 81 to 90 (82-1 to 91-1) parts by weight of component (i). In an another embodiment it is possible to deduct the amount of component (iii) from the preferred amounts of component (ii) so that again the sum of the amounts of components (i), (ii) and (III) adds up to 100 parts by weight.

Thus, preferably the carboxy-functional dispersant is a copolymer comprising benzyl methacrylate and methacrylic acid.

The function of the carboxylic acid group(s) in the dispersant is primarily to cross-link with the crosslinking agent and to provide the subsequent polymer-encapsulated pigment particles with the ability to disperse in aqueous ink media. Where carboxylic acid group(s) are the only groups for stabilising the polymer-encapsulated pigment particles in the aqueous medium it is preferable to have a molar excess of carboxylic acid groups to carboxy-reactive groups (e.g. epoxy groups) in the crosslinking agent to ensure that unreacted carboxylic acid groups remain after the crosslinking reaction has been completed. In one embodiment the ratio of moles of carboxylic acid groups to moles of carboxy-reactive groups (e.g. epoxy groups) in the crosslinking agent is preferably from 10:1 to 1.1:1, more preferably from 5:1 to 1.1:1 and especially preferably from 3:1 to 1.1:1.

The dispersant may optionally have other stabilising groups. The choice of the stabilising groups as well as the amounts of such groups will depend to a large extent on the nature of the aqueous medium.

In embodiments where the crosslinking agent has one or more oligomeric dispersing group the dispersant preferably has an acid value of at least 125 mg KOH/g.

The acid value of the dispersant, prior to crosslinking with the crosslinking agent, is preferably from 130 to 320 and more preferably from 135 to 250 mg KOH/g. We have found that dispersants having such acid values provide resultant polymer-encapsulated pigment particles which exhibit good stability in aqueous inks and also have sufficient carboxy groups for subsequent crosslinking with the crosslinking agent. Preferably, the dispersant (prior to crosslinking) has a number average molecular weight of from 500 to 100,000, more preferably from 1,000 to 50,000 and especially from 1,000 to 35,000. The molecular weight may be measured by gel permeation chromatography.

The dispersant need not be totally soluble in the liquid medium used to make the polymer-encapsulated pigment particles. That is to say perfectly clear and non-scattering solutions are not essential. The dispersant may aggregate in surfactant-like micelles giving slightly hazy solutions in the liquid medium. The dispersant may be such that some proportion of the dispersant tends to form a colloid or micellar phase. It is preferred that the dispersant produces uniform and stable dispersions in the liquid medium used to make the polymer-encapsulated pigment particles which do not settle or separate on standing.

It is preferred that the dispersant is substantially soluble in the liquid medium used to make the polymer-encapsulated pigment particles, giving rise to clear or hazy solutions.

Preferred random polymeric dispersants tend to give clear compositions whilst less preferred polymeric dispersants with two or more segments tend to give rise to the aforementioned hazy compositions in liquid media.

Typically the dispersant adsorbs onto the pigment prior to crosslinking so as to form a relatively stable dispersion of the pigment particles. This dispersion is then crosslinked using the crosslinking agent to form the polymer-encapsulated pigment particles. This pre-adsorption and pre-stabilisation in particular distinguishes the present invention from coacervation approaches whereby a polymer or pre-polymer (which is not a dispersant) is mixed with a pigment, a liquid medium and the crosslinking agent and only during or after crosslinking does the resultant cross-linked polymer precipitate onto the pigment.

In embodiments where the dispersant has an acid value of at least 125 mg KOH/g the crosslinking agent may have no oligomeric dispersing groups, but preferably the crosslinking agent has one or more oligomeric dispersing groups.

Crosslinking agents having one or more oligomeric dispersing group increase the stability of the polymer-encapsulated pigment particles in the ink.

The oligomeric dispersing group preferably is or comprises polyalkyleneoxide, more preferably a poly$C_{2-4}$-alkyleneoxide and especially a polyethyleneoxide. The polyalkyleneoxide groups provide steric stabilisation which improves the stability of the resulting encapsulated pigment.

Preferably the polyalkyeneoxide contains from 3 to 200, more preferably from 5 to 50 alkyleneoxide and especially from 5 to 20 alkyleneoxide repeat units.

The crosslinking agent preferably has at least two epoxy groups.

Preferred crosslinking agents having two epoxy groups and zero oligomeric dispersing groups are ethylene glycol diglycidyl ether, resorcinol diglycidyl ether, neopentyl glycol diglycidyl ether, 1,6-hexanediol diglycidyl ether, hydrogenated bisphenol A diglycidyl ether and polybutadiene diglycidyl ether.

Preferred crosslinking agents having two epoxy groups and one or more oligomeric dispersing groups are diethylene glycol diglycidyl ether, poly ethylene glycol diglycidyl ether, dipropylene glycol diglycidyl ether and poly propylene glycol diglycidyl ether.

Preferred crosslinking agents having three or more epoxy groups and zero oligomeric dispersing groups are sorbitol polyglycidyl ether, polyglycerol polyglycidyl ether, pentaerythritol polyglycidyl ether, diglycerol polyglycidyl ether, glycerol poly glycidyl ether and trimethylolpropane polygycidyl ether.

In one embodiment the epoxy crosslinking agent has zero oligomeric dispersing groups.

Examples of oxetane crosslinking agents include 1,4-bis [(3-ethyl-3-oxetanylmethoxymethyl)]benzene, 4,4'-bis[(3-ethyl-3-oxetanyl)methoxy]benzene, 1,4-bis[(3-ethy-3-oxetanyl)m ethoxyl -benzene, 1,2-bis[(3-ethyl-3-oxetanyl)-methoxy]benzene, 4,4-bis[(3-ethyl-3-oxetanyl)methoxy] biphenyl and 3,3',5,5'-tetramethyl-[4,4'-bis(3-ethyl-3-oxetanyl)methoxy]biphenyl.

Examples of carbodiimide crosslinking agents include crosslinker CX-300 from DSM NeoResins. Carbodiimide crosslinking agents having good solubility or dispersibility in water may also be prepared as described in U.S. Pat. No. 6,124,398, synthetic Examples 1 to 93.

Examples of isocyanate crosslinking agents include isophorone diisocyanate, hexamethylene diisocyanate, toluene diisocyanate, methylene diphenyl diisocyanate, methylene dicyclohexyl diisocyante, 2-methyl-1,5-pentane diisocyanate, 2,2,4-trimethyl-1,6-hexane diisocyante and 1,12-dodecane diisocyanate, 1,11-diisocyanatoundecane, 1,12-diisocyanatododecane, 2,2,4- and 2,4,4-trimethyl-1,6-diisocyanatohexane, 1,3-diisocyanatocyclobutane, 4,4'-bis-(isocyanatocyclohexyl)-methane, hexamethylene diisocyanate, 1,2-bis-(isocyanatomethyl)-cyclobutane, 1,3- and 1,4-bis-(isocyanatomethyl)cyclohexane, hexahydro-2,4-and/or-2,6-diisocyanatoluene, 1-isocyanato-2-isocyanatomethyl cyclopentane, 1-isocyanato-3-isocyanatomethyl-3,5,5-trimethyl-cyclohexane, 2,4'-dicyclohexylmethane diisocyanate, and 1-isocyanato-4(3)-isocyanatomethyl-1-methyl cyclohexane, tetramethyl-1,3-and/or -1,4-xylylene diisocyanate, 1,3- and/or 1,4-phenylene diisocyanate, 2,4- and/or 2,6-toluene diisocyanate, 2,4- and/ or 4,4'-diphenyl-methane diisocyanate, 1,5-diisocyanatonaphthalene, and p-xylylene diisocyanate. Suitable diisocyanates are also understood to include those containing modification groups such as biuret, uretdione, isocyanurate, allophanate and/or carbodiimide groups, as long as they contain two or more isocyanate groups. For isocyanates the liquid medium is preferably non-aqueous, although water can sometimes be tolerated with blocked isocyanates.

In a preferred embodiment, the polyisocyanate crosslinking agent contains three isocyanate groups. A convenient source of triisocyanate functional compounds is the known isocyanurate derivative of diisocyanates. Isocyanurate derivatives of diisocyanates can be made by reacting the diisocyanate together with a suitable trimerization catalyst. An isocyanurate derivative is produced that contains an isocyanurate core with pendant organic chains terminated by three isocyanate groups. Several isocyanurate derivatives of diisocyanates are commercially available. In one preferred embodiment, the isocyanurate used is the isocyanurate of isophorone diisocyanate. In another preferred embodiment, the isocyanaurate of hexamethylene diisocyanate is used.

Examples of N-methyol crosslinking agents include dimethoxydihydroxy ethylene urea; N,N-dimethylol ethyl carbamate; tetramethylol acetylene diurea; dimethylol urone; dimethylol ethylene urea; dimethylol propylene urea; dimethylol adipic amide; and mixtures comprising two or more thereof.

Examples of keteneimine crosslinking agents include compounds of formula $Ph_2C=C=N-C_6H_4-N=C=CPh_2$ wherein each Ph independently is an optionally substituted phenyl group.

Examples of hydrazide crosslinking agents include malonic dihydrazide, ethylmalonic dihydrazide, succinic dihydrazide, glutaric dihydrazide, adipic dihydrazide, isophthalic dihydrazide, oxalyl dihydrazide and pimelic dihydrazide.

Commercially available highly reactive oxazoline crosslinking agents are available from, for example, Nippon Shokubai under the Epocross® trade mark. These include the emulsion type (e.g. the Epocross K-2000 Series, such as K-2010E, K-2020E and K-2030E) and the water-soluble types (e.g. the Epocross WS Series, such as WS-300, WS-500 and WS-700).

Examples of aziridine crosslinking agents include ethylene imine-based polyaziridines (e.g. PZ-28 and PZ-33 available from PolyAziridine LLC, Medford, N.J.); XC-103 tri-functional aziridines, XC-105 polyfunctional aziridines and Crosslinker XC-113 (available from Shanghai Zealchem Co., Ltd., China); polyfunctional aziridine liquid crosslinker SaC-100 (available from Shanghai UN Chemical Co., Ltd, China); The aziridines crosslinking agents disclosed in WO 2009/120420; NeoCryl® CX-100 (available from DSM NeoResins); Xama® polyfunctional aziridines (available from Lubrizol); trimethylolpropane tris(beta-aziridino)propionate, neopentylglycol di(beta-aziridino)propionate, glyceryl tris(beta-aziridino)propionate, pentaerythrityltetra(beta-aziridino)propionate, 4,4'-isopropylidenediphenol di(beta-aziridino)propionate, 4,4'-methylenediphenol di(beta-aziridino); and mixtures comprising two or more thereof.

Particularly preferred crosslinking agents are polyethylene glycol diglycidyl ether (e.g. having an average molecular weight 526, obtainable from Aldrich) and/or trimethylolpropane polyglycidyl ether (e.g. Denacol® EX-321, obtainable from Nagase Chemtex, with weight per epoxy of 140).

Preferred methods for making the self-dispersible pigment are described in WO2006/064193 and WO2010/038071. In essence, a dispersant having carboxy groups is adsorbed onto a pigment and then some (but not all) of the carboxy groups are crosslinked to give a pigment dispersion where the pigment is permanently trapped within the crosslinked dispersant. Self-dispersible pigments such as these (according to the present invention) are commercially available from FUJIFILM Imaging Colorants Limited as Pro-Jet® APD 1000 pigments and as Pro-Jet® APD 4000 pigments.

The self-dispersible pigments for use in the present invention may be prepared as described below.

(i) Preparation of the Dispersant

A dispersant was prepared by solution copolymerisation of benzyl methacrylate and methacrylic acid at weight proportions of 78.5 to 21.5 respectively. The dispersant was isolated in the form of a dry solid and had an acid value of 2.5 mmoles of acid groups/g of dispersant.

(ii) Preparation of the Dispersant Solution

The dispersant, 200 parts by weight was dissolved in water to make up to 1000 parts by weight and neutralised with potassium hydroxide aqueous solution to give an aqueous solution having a pH of about 9 containing approximately 20% by weight of the dispersant (1).

(iii) Preparation of the Pigment Mill-bases

Black Mill-base

Pigment powder (90 parts by weight of a Carbon Black pigment) and the dispersant solution (1) (180 parts) were mixed together to form a pre-mixture. Water was added to the pre-mixture as appropriate to provide a suitable viscosity for mixing and milling.

The pre-mixture was thoroughly mixed together. After mixing the mixture was transferred to a bead mill containing milling beads. The mixture was then milled for several hours until the desired particle size of approximately 110 nm had been reached. The particle size was the Z averaged particle size as measured by a Malvern Zetasizer®.

The milling beads were then removed from the milled mixture. This resulted in a black mill-base.

Magenta Mill-base

The magenta Mill-base was prepared in exactly the same way as the black mill-base (1) except that a magenta pigment (85 parts by weight of C.I. Pigment 122) and 127.5 parts by weight of dispersant solution were used. For the magenta mill-base (1) milling was continued for several hours until a particle size of approximately 120 nm had been obtained.

Yellow Mill-base

The yellow mill-base was prepared in exactly the same way as the black mill-base except that a yellow pigment (100 parts by weight of C.I. Pigment Yellow 74) and 250 parts by weight of the dispersant solution. For the yellow mill-base (1) the milling was continued for several hours until a particle size of approximately 120 nm had been obtained.

Cyan Mill-base (1)

150 parts by weight of a C.I. Pigment Blue 15:3 powder and the dispersant solution (225 parts) were mixed together to form a pre-mixture. Water was added to the pre-mixture as appropriate to provide a suitable viscosity for mixing and milling.

The pre-mixture was thoroughly mixed together. After mixing the mixture was transferred to a bead mill containing milling beads. The mixture was then milled for several hours until the desired particle size of approximately 120 nm had been reached.

(iv) Preparation of the Self-dispersible Pigment

The mill-bases prepared above were adjusted to a solids content of about 10% by weight by the addition of pure water.

The dispersants in each of the mill-bases were then cross-linked using a cross-linking agent, (Denacol® EX-321 obtained from Nagase ChemteX, with weight per epoxy=140, hereafter abbreviated as EX-321). This cross-linked the carboxylic acid groups in the dispersant and thereby encapsulated the pigment. The cross-linking reaction was controlled by the presence of a small amount of boric acid (obtained from Aldrich). The cross-linking reaction was effected by heating the above described mixture to a temperature of about 65° C. for 5 hours. This resulted in the self-dispersible pigments shown in Table 1.

TABLE 1

| Self-dispersible pigment | Mill-base (parts) | Cross-linking agent (parts) | Boric acid (parts) |
|---|---|---|---|
| Cyan Pigment | Cyan Mill-base 1 (3) | EX321 (6.3) | 2.78 |
| Magenta Pigment | Magenta Mill-base 1 (3) | EX321 (3.57) | 1.58 |
| Yellow Pigment | Yellow Mill-base 1 (3) | EX321 (4.9) | 2.16 |
| Black Pigment | Black Mill-base 1 (3) | EX321 (5.04) | 2.23 |

Cross-linking (v) Purification of the Self-dispersible Pigment

The self-dispersible pigments prepared above were each purified by means of ultrafiltration. The self-dispersible pigment dispersions were diafiltered with pure water. The ultrafiltration membrane was then used to concentrate the self-dispersible pigment dispersions back to a solids content of around 10 to 13% by weight.

Preferably component (a) is present in a range of from 2 to 6 parts by weight.

The first solvent, component (b), is preferably triethylene glycol and/or propylene glycol, more preferably component (b) is triethylene glycol.

The first solvent is preferably present in the range of from 10 to 20 parts and more preferably in a range of from 13 to 17 parts by weight.

Thus, preferably the first solvent, component (b), comprises from 10 to 20 parts by weight of triethylene glycol and/or propylene glycol, more preferably the first solvent, component (b), comprises from 10 to 20 parts by weight of triethylene glycol.

Component (c), the second solvent, is preferably 2-pyrrolidone or N-methyl-2-pyrrolidone more preferably the second solvent is 2-pyrrolidone.

Preferably component (c) is present in the range of from 3 to 7 parts by weight.

Thus, preferably the second solvent, component (c), comprises from 3 to 7 parts by weight of 2-pyrrolidone.

Component (d), glycerol, is preferably present in the range of from 18 to 35 parts by weight and is more preferably present in the range of from 24 to 34 parts by weight.

In one preferred embodiment glycerol is present at less than 32 parts by weight.

One of the roles of glycerol is to help control the viscosity of the ink. The first solvent (component (b)) is also important in viscosity control. Thus, the levels of these two components are interrelated.

Component (e) may comprise more than one styrene butadiene latex binder and/or polyurethane latex binder. The latex binders may differ in their properties, such as particle size, glass transition temperature or molecular weight.

However, component (e) preferably comprises either a styrene butadiene latex binder or a polyurethane binder.

In a preferred embodiment, component (e) comprises a styrene butadiene latex binder and more preferably a carboxylated styrene butadiene latex binder.

In a second preferred embodiment component (e) comprises a polyurethane binder.

In the first preferred embodiment the styrene butadiene latex binder has a Tg in the range of from −25° C. to 35° C. and more preferably in the range of from −15° C. to 28° C. and especially in the range of from −5° C. to 10° C.

Preferably the styrene butadiene and latex binder is prepared by emulsion polymerisation.

The molecular weight of the styrene butadiene latex binder can be controlled by methods known in the art, for example, by use of a chain transfer agent (e.g. a mercaptan) and/or by control of initiator concentration in the case of emulsion polymerisation, and/or by heating time. Preferably the styrene butadiene latex binder has a molecular weight of greater than 20,000 Daltons and more preferably of greater than 100,000 Daltons. It is especially preferred that the molecular weight of the styrene butadiene latex binders is in the range of from 200,000 to 500,000 Daltons.

The styrene butadiene latex binder may be monomodal, preferably with an average particle size of below 1000 nm, more preferably below 200 nm and especially below 150 nm. Preferably, the average particle size of the styrene butadiene latex binder is at least 20 nm and more preferably at least 50 nm. Thus, the styrene butadiene latex binder may preferably have an average particle size in the range of from 20 to 200 nm and more preferably in the range of from 50 to 150 nm. The average particle size of the styrene butadiene latex binder may be measured using photon correlation spectroscopy.

The molecular weight of the styrene butadiene latex binder may be determined by Gel Permeation Chromatography against polystyrene standards using an Agilent HP1100 instrument with THF as eluent and PL Mixed Gel C columns.

The styrene butadiene latex binder once formed is preferably screened to remove oversized particles prior to use, for example through a filter having an average pore size below 3 µm, preferably 0.3 to 2 µm, especially 0.5 to 1.5 µm. The styrene butadiene latex binder may be screened before, during or after it is mixed with other components to form the ink.

Commercially available styrene butadiene latex binder may be used in the ink of the present invention.

Examples of commercially available styrene butadiene latexes which can be used in the ink of the pre present invention include styrene butadiene latexes in the Rovene range supplied by Mallard Creek polymers, particularly Rovene 4180, 5550 and especially Rovene 4170.

The styrene butadiene latex binder cures on heating after printing and so binds the pigment to the, preferably textile, substrate. The curing mechanism preferably comprises the formation of internal cross-links within the styrene butadiene latex binder. Preferably the styrene butadiene latex binder is self cross-linking.

In the second preferred embodiment component (e) comprises a polyurethane binder.

Polyurethane latex binders are typically made by:
(i) reaction of a polymeric diol (polyol), and optionally other components capable of reacting with isocyanate groups, with a di-isocyanate to create a pre-polymer, followed by;
(ii) dispersion into water optionally with chain-extension of the prepolymer by reaction with water and/or a chain-extender present in the water phase;

The dispersion may be stabilised by monomers present in the polyurethane, for example ionic groups or non-ionic groups, or by added surfactants.

The Tg of the polyurethane latex binder may be controlled through the selection of the polyol, the di-isocyanate and the chain extender. It is also possible to control the Tg of the polyurethane binder latex by mixing batches of latex with a different Tg.

Preferably the polyurethane latex binder has a Tg in the range of from −25° C. to 80° C. and more. In a preferred embodiment the polyurethane latex binder has a Tg in the range of from −5° C. to 25° C. In a second preferred embodiment the polyurethane latex binder has a Tg in the range of from 50° C. to 70° C.

The weight average molecular weight of the polyurethane is preferably >20,000, more preferably >50,000 and most preferably >100,000.

The polyurethane latex binder preferably may be monomodal with an average particle size of below 1000 nm, more preferably below 200 nm and especially below 150 nm. Preferably, the average particle size of the latex binder is at least 20 nm, more preferably at least 50 nm. Thus, the latex binder may preferably have an average particle size in the range of from 20 to 200 nm and more preferably in the range of from 50 to 150 nm. The average particle size of the latex binders may be measured using photon correlation spectroscopy.

Commercially available polyurethane latex binders include W835/177 and W835/397 from Incorez; Joncryl® U4190 and Joncryl 5200 from BASF; Sancure® 20025F, Sancure 2710 and XPD 3110 from Lubrizol; Neorez R551 and R600 from DSM; Dispurez® 101A and Dispurez 102 from Incorez; and Dispecoll® U42 and Bayhydrol® UH2606 from Covestrol.

The styrene butadiene latex binder and/or polyurethane latex binders may also show a bimodal particle size distribution. This may be achieved either by mixing two or more latexes of different particle size, or by generating the bimodal distribution directly, for example by two-stage polymerisation. Where a bimodal particle size distribution is used it is preferred that the lower particle size peak is in the range 20-80 nm, and the higher particle size peak is in the range 100-500 nm. It is further preferred that the ratio of the two particle sizes is at least 2, more preferably at least 3 and most preferably at least 5.

Component (e) is preferably in the range of from 6 to 10 parts by weight.

The acetylenic surfactant used as component (f) is preferably 2,4,7,9-tetramethyl-5-decyne-4,7-diol or an ethylene oxide condensate thereof or 2,5,8,11-tetramethyl-6-dodecyne-5,8-diol or an ethylene oxide condensate thereof. Surfactants such as this are available, for example, as Surfynol® and Dynol® surfactants from Air Products.

Preferably the surfactant, component (f) is 2,4,7,9-tetramethyl-5-decyne-4,7-diol, commercially available as Surfynol® 440 from Air Products Component (f) is preferably present in the composition in a range of from 0.001 to 2.5 parts, more preferably in a range of from 0.01 to 1.5 parts, especially in a range of from 0.1 to 1.0 part and more especially in a range of from 0.2 to 0.7 parts by weight.

The surfactant is a key component in the inks of the present invention. Correct choice of both the surfactant and its concentration in a particular ink is essential in the ink-jetting effectively and in not wetting the face-plate of the print-head.

It is essential that the surfactant does not cause the ink to foam.

It is also desirable that the ink is designed so that it does not wet print-head face-plates that are not treated with a "non-wetting coating". These face-plates may show a contact angle with water of less than 90°, or less than 80°. Face-plates that are specifically designed to be non-wetting may have a contact angle with water of more than 90° C., sometimes more than 95°, and sometimes even more than 100°.

To achieve these properties it is desirable that the ink shows a dynamic surface tension range, i.e. that its surface tension is dependent on the surface age. The surface tension of a newly created surface is high, but drops as surfactant, or other surface active species, migrate to the surface. The dynamic surface tension range may be determined by measurements in a bubble tensiometer. This measures the surface tension as a function of surface age or bubble frequency. It is preferred that the surface tension measured at 10 ms ($\gamma(10)$) is >35 dynes/cm, and the surface tension measured at 1,000 ms ($\gamma(1000)$) is in the range 20 to 40 ynes/cm, with $\gamma(10)>\gamma(1000)$. Alternatively the equilibrium surface tension of the ink can be compared with that of the equivalent ink made without inclusion of the surfactant(s). It is preferred that the equilibrium surface tension without surfactant is at least 10 dynes/cm higher than that where the surfactant(s) is (or are) present.

Component (g) 1,2-benzisothazolin-3-one, is a broad spectrum alkali stable antimicrobial which does not release formaldehyde. It is available as a 20% active solution from Lonza as Proxel® GXL.

Component (g) is preferably present in the composition in an amount of 0.001 to 2 and more preferably from 0.005 to 0.2 parts by weight.

The ink preferably has a MFFT below 80° C., more preferably below 75° C., especially below 65° C. and more especially below 60° C.

The MFFT is the lowest temperature at which components of the ink components will coalesce to form a film, e.g. during ink drying.

Equipment for measuring MFFT is commercially available, for example the Minimum Film Forming Temperature Bar is available from Rhopoint Instruments (the "MFFT Bar 90"). The MFFT Bar 90 comprises a temperature bar having a nickel-plated copper platen with an electronically imposed temperature gradient. Ten equally spaced sensors beneath the surface provide instantaneous temperature measurement along the bar. The desired temperature program is selected and the instrument allowed to reach thermal equilibrium. Tracks of wet test ink may be applied using a cube applicator, or spreader. Once the ink has dried the device shows the MFFT. If for any reason the above mentioned commercially available equipment does not work on the ink (e.g. due to a low latex content and/or the ink's colour), one may instead place a small amount of the ink in a dish and heat the dish containing the ink at the desired assessment temperature (e.g. 70° C.) for 24 hours and then rub the surface with a gloved finger to assess whether a film has formed. If a film has formed there will be little or no ink transfer to the gloved finger, whereas if a film has not formed there will be a significant transfer of ink to the gloved finger or the dried ink will crack.

The desired MFFT may be achieved by selecting appropriate combinations of polymer latex and organic solvents.

Preferably the viscosity of the ink at 32° C. is in the range of from 10 to 17 mPa·s and more preferably in a range of from 11 to 16 mPa·s when measured using a Brookfield DV-II or DV-II+ digital viscometer with UL-adapter and water jacket and spindle SOO at 3 rpm Preferably the ink has a surface tension of from 20 to 65 dynes/cm, more preferably of from 20 to 50 dynes/cm, especially of from 32 to 42 dynes/cm, more especially of from 34 to 39 dynes/cm and particularly of from 34 to 38 dynes/cm when measured at 25° C. using a Kruss K-11 Tensiometer (Wilhelmy Plate Method).

Preferably, the ink composition has been filtered through a filter having a mean pore size of less than 10 microns, more preferably less than 5 microns and especially less than 1 micron.

Preferably the ink has a pH in the range of from 7.5 to 9.5, and more preferably in the range of 8 to 9. The pH may be adjusted by means of a suitable buffer.

In addition to the above mentioned components, the ink composition may optionally comprise one or more ink additives. Preferred additives suitable for ink-jet printing inks are anti-kogation agents, rheology modifiers, corrosion inhibitors and chelating agents. Preferably, the total amount of all such additives is no more than 10 parts by weight. These additives are added to and comprise part of component (h), the water added to the ink.

In one preferred embodiment the aqueous ink comprises:
(a)i from 2 to 6 parts by weight of a self-dispersible pigment which comprises a carboxy-functional dispersant crosslinked around a pigment core by a crosslinking agent having at least two groups selected from oxetane, carbodiimide, hydrazone, oxazoline, aziridine, isocyanate, N-methylol, keteneimine, isocyanurate and epoxy groups;
(b)i from 12 to 20 parts by weight of triethylene glycol and/or propylene glycol, preferably triethylene glycol
(c)i from 3 to 7 parts by weight of 2-pyrrolidone;
(d)i from 24 to 34 parts by weight of glycerol;
(e)i from 6 to 10 parts by weight of a styrene butadiene latex binder
(f)i from 0.01 to 1.5 parts by weight of 2,4,7,9 tetramethyl-5-decyne-4,7-diol;
(g)i from 0.005 to 0.1 parts by weight of 1,2-benzisothiazolin-3-one; and
(h)i the balance to 100 parts by weight of water.

In a second preferred embodiment the aqueous ink comprises
(a)ii from 2 to 6 parts of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
(b)ii from 12 to 20 parts by weight of triethylene glycol and/or propylene glycol, preferably triethylene glycol;
(c)ii from 3 to 7 parts by weight of 2-pyrrolidone;
(d)ii from 24 to 34 parts by weight of glycerol;
(e)ii from 6 to 10 parts by weight of a polyurethane latex binder;
(f)ii from 0.01 to 1.5 parts by weight of 2,4,7,9 tetramethyl-5-decyne-4,7-diol;
(g)ii from 0.005 to 0.1 parts by weight of 1,2-benzisothiazolin-3-one; and
(h)ii the balance to 100 parts by weight of water.

Preferences for the components of the first and second preferred embodiments are as described and preferred above.

A second aspect of the invention provides an ink-jet printing process wherein the ink according to the first aspect of the invention is printed onto a substrate by means of an ink jet printer. Preferably the ink-jet printer has a print-head with multiple nozzles arranged at a high density on a face plate to enabling single-pass printing.

A preferred embodiment of the second aspect of the invention is an ink-jet printing process wherein the ink according to the first aspect of the invention is printed onto a textile substrate using an ink jet printer with single-pass print-head followed by curing of the printed textile substrate.

The process of the second aspect of the present invention may use any ink-jet printer with a single-pass multi-channel print-head. Preferably the print-head has an ink re-circulation channel in the ink supply system. This channel allows for fresh ink to be available for jetting and can be part of the ink supply system or even specially engineered channels which run behind the nozzle plate (face plate). It is preferred that the ink supply system runs behind the nozzle plate (face plate) as this allows for the use of more volatile inks whilst not compromising restart/latency behaviour. Behind nozzle plate (face plate) re-circulation is exemplified in commercially available FUJIFILM Dimatix print-heads such as Samba® or SG1024®.

Re-circulating print-heads of the type preferred in the present invention are usually equipped with a reservoir heater and a thermistor to control the jetting temperature. Preferably, the jetting temperature is in excess of 30° C.

Preferably the drop volume of the ink applied by the ink-jet printer is in the range of from 1 to 100 pl, more preferably in the range of 4 to 40 pl and especially in the range of from 5 to 15 pl.

In one embodiment the process of present invention uses an ink-jet printer with a print-head able to fire different drop volumes (i.e. a greyscale print-head).

The textile substrate may comprise natural or synthetic fibers including blends thereof.

Thus, the textile substrate may comprise cotton, cellulose, including viscose rayon and regenerated viscose rayon, wool, acrylic, polyamide such as nylon, polyester such as polyethylene glycol terephthalate or polyurethane.

Preferably the textile substrate comprises cotton or a blend thereof.

The textile substrate is preferably woven or knitted or in the form of dry or wet-laid fibers. It may be in the form of sheets, webs, threads or ready made up garments such as drapes, shirting, toweling, underwear, socks and sheeting.

The textile substrate may be printed without any pretreatment. However, in some circumstances a pretreatment may be required. The exact pretreatment will depend on the nature of the textile substrate and will be well known to a person skilled in the art.

In the process of the present invention any curing mechanism may be utilized. However, it is preferred that the printed textile substrate is heat cured.

Any means of heat curing may be utilized though preferably the textile substrate is cured by a method comprising infra-red or hot air.

A particular advantage of the present invention is that the textile substrate can be cured rapidly at a low temperature. Thus, it is preferred that the printed textile substrate is cured for 5 minutes or less, more preferably for 2 minutes or less, especially 30 seconds or less and more especially 10 seconds or less. The temperature is preferably below 160° C., more preferably below 125° C.

The exact temperature and exposure time used in the heat curing process will also, of course, depend on the nature and properties of the printed textile substrate.

In one preferred embodiment the textile substrate is cured immediately after single-pass printing in an in-line process. In this embodiment it is vital to cure as rapidly as possible preferably 30 seconds or less or more preferably 10 seconds or less.

Preferably the mechanism of curing comprises the formation of internal cross-links within the styrene butadiene latex binder and/or polyurethane binder.

More preferably the styrene butadiene latex binder and/or polyurethane latex binders are self cross-linking.

The process of the second aspect present invention may also comprise one of more drying steps prior to curing.

Drying may be carried out by any suitable means. Preferably drying is carried out using air-velocity to achieve substrate temperature between 60-120° C.

Medium wavelength-IR or near-IR drying and hybrid drying technologies may also be used.

One preferred embodiment uses medium wavelength IR dryer/impinged air and/or a hot air combination.

The process of the second aspect of the present invention may further comprise additional textile processing steps such as the application of additional finishes. These finishes are designed to give particular properties to the final form of the substrate such as rendering it antistatic, fire resistant or antimicrobial.

In a preferred process according to the invention printing, drying and curing of the printed ink are carried out by in-line process.

A third aspect of the present invention provides a substrate printed by an ink-jet printing process as described in the second aspect of the invention using an ink as described in the first aspect of the invention. This substrate is as described and preferred in the second aspect of the invention.

Thus, preferably the third aspect of the invention provides a textile printed by an ink-jet printing process as described in the second aspect of the invention or using an ink as described in the first aspect of the invention.

According to a fourth aspect of the present invention there is provided an ink-jet printer ink container (e.g. a cartridge or a larger ink tank) containing an ink as described in the first aspect of the present invention.

A fifth aspect of the present invention provides an ink-jet printer with an ink re-circulating printer head, as described in the second aspect of the invention, containing an ink-jet printer ink container as described in the fourth aspect of the invention.

A sixth aspect of the invention provides an ink-set comprising two or more different coloured inks where at least one of the inks is as described and preferred in the first aspect of the invention. The ink-set of the sixth aspect of the invention may contain inks other than those defined and described in the first aspect of the invention.

In a first preferred embodiment the sixth aspect of the invention comprises an ink-set comprising a black ink, a cyan ink, a yellow ink and a magenta ink wherein at least on of the inks is as described and preferred in the first aspect of the invention. Preferably all of the inks in the first preferred embodiment of the sixth aspect of the invention are as described and preferred in the first aspect of the invention. Preferably the pigment in the black ink is carbon black; in the cyan ink is Pigment Blue 15:3; in the yellow ink is Pigment Yellow 74 and/or Pigment Yellow 155; and in the magenta ink is Pigment Red 122.

A second preferred embodiment of the sixth aspect of the invention provides an ink-set comprising a black ink, a cyan ink, a yellow ink, a magenta ink, a blue ink and a red ink and optionally, a light black or grey ink, an orange ink, a light cyan ink, a light magenta ink or a white ink wherein at least one of the inks is as described in the first aspect of the present invention. In this ink-set the pigment in the blue ink is preferably Pigment Blue 60; the pigment in the red ink is Pigment Red 254 and the pigment in the white ink is titanium dioxide and the black, cyan, yellow and magenta ink are as in the first preferred embodiment of the sixth aspect of the invention. In the second preferred embodiment preferably all the inks, apart from the white ink, are as described and preferred in the first aspect of the invention.

The invention is further illustrated by the following Examples in which all parts and percentages are by weight unless otherwise stated.

EXAMPLES

Ink and Comparative Ink Examples

The self-dispersible pigment used were Pro-Jet® APD 4000 Black (K) (Carbon Black) and Pro-Jet® APD 4000 Magenta (M) (Pigment Red 122). The Pro-Jet® APD 4000 pigment dispersions are available from FUJIFILM Imaging Colorants Limited.

Surfynol® 440 is an acetylenic surfactant from Air Products.

Rovene® 4170 is a styrene butadiene dispersion from Mallard Creek Polymers. The Tg of Rovene 4170 is 4° C. and the acid number is 50mgKOH/g.

1,2-Benzisothazolin-3-one was obtained as Proxel GXL (20% solution) from Lonza.

Polyurethane latex binder 1 (PU Binder 1) is Bayhydrol® UH2606 from Covestro.

Polyurethane latex binder 2 (PU Binder 2) is Dispecoll® U42 from Covestro.

PEG 20 is polyethylene glycol 20,000.

EG is ethylene glycol.

TEG is triethylene glycol.

PG is propylene glycol.

2-P is 2-pyrrolidone.

Example Inks 1 to 3 and Comparative Example Inks C1 to C3 were prepared as shown below in Table 2.

TABLE 2

| | Ink 1 | Ink 2 | Ink 3 | Ink C1 | Ink C2 | Ink C3 |
|---|---|---|---|---|---|---|
| ProJet ADP 4000 K | | 4 | 4 | 4 | 4 | 4 |
| ProJet ADP 4000 M | 4 | | | | | |
| PEG 20 | | | | 5.2 | 3 | 1 |
| EG | | | | 1.25 | | |
| TEG | 18 | 15 | | | 10 | 15 |
| PG | | | 15 | | | |
| 2-P | 5 | 5 | 5 | 5 | 5 | 5 |
| Glycerol | 30 | 27 | 28 | 3.75 | 10 | 18.5 |
| Surfynol 440 | 0.52 | 0.5 | 0.5 | 0.3 | 0.4 | 0.5 |
| Proxel GXL | 0.02 | 0.02 | 0.02 | 0.02 | 0.02 | 0.02 |
| Rovene 4170 | 8 | | | | | |
| PU Binder 1 | | 8 | 8 | 8 | 8 | 8 |
| Water to 100 parts | | | | | | |

Properties of the Example Inks and Comparative Example Inks

The properties of Example Inks 1 to 3 and Comparative Example Inks C1 to C3 are shown below in Table 3

TABLE 3

| | Ink 1 | Ink 2 | Ink 3 | C Ink 1 | C Ink 2 | C Ink 3 |
|---|---|---|---|---|---|---|
| Viscosity at 32° C. (cP) | 12.24 | 12.3 | 12.96 | 12.84 | 12.46 | 11.94 |
| Surface Tension at 25° C. (mN/m) | 36.24 | 35.6 | 35.75 | 36.17 | 36.03 | 35.31 |
| pH | 8.53 | 8.36 | 8.36 | 8.46 | 8.33 | 8.31 |

Surface tension was measured at 25° C. using a Kruss K-11 Tensiometer (Wilhelmy Plate Method).

Viscosity was measured at 32° C. using a Brookfield DV-II or DV-II+ digital viscometer with UL-adapter and water jacket and spindle SOO at 3 rpm.

Ink Performance

Example Inks 1 to 3 and Comparative Inks 1 to 3 were printed through a SG1024 SA single-pass recirculating printhead mounted on a JetXpert imaging rig. Small, medium and large drops were printed at 8 kHz and 19 kHz frequency.

Example inks 1 to 3 all fired reliably through all the nozzles and caused only minimal face-plate wetting.

However, the Comparative Inks all failed to fire reliably and they all caused significant face-plate wetting.

Thus although all the inks display similar properties, as shown in Table 3, only those inks according to the present invention display acceptable performance and would be suitable for use in an industrial single-pass ink-jet printer.

Example Ink Set

Table 4 shows an ink-set according to the present invention able to give a full scope of color when printed on a range of Textile substrates. In addition to the components used above, ProJet ADP 1000 Black (Carbon Black), ProJet ADP 1000 Cyan (Pigment Blue 15:3), ProJet ADP 1000 Yellow LF (Pigment Yellow 155), ProJet ADP 1000 Red (Pigment Red 254) and ProJet ADP 1000 Blue (Pigment Blue 60) were also used. Pro-Jet® APD 1000 pigment dispersions are available from FUJIFILM Imaging Colorants Limited.

TABLE 4

Ink-Set Example

| | Cyan Ink | Magenta Ink | Yellow Ink | Black Ink | Red Ink | Blue Ink |
|---|---|---|---|---|---|---|
| ProJet ADP 1000 Cyan | 4 | | | | | |
| ProJet ADP 4000 Magenta | | 4 | | | | |
| ProJet ADP 1000 Yellow LF | | | 4 | | | |
| ProJet ADP 1000 Black | | | | 4 | | |
| ProJet ADP 1000 Red | | | | | 4 | |
| ProJet ADP 1000 Blue | | | | | | 4 |
| TEG | 15 | 18 | 15 | 15 | 15 | 15 |
| 2-P | 5 | 5 | 5 | 5 | 5 | 5 |
| Glycerol | 30 | 30 | 29 | 27 | 30 | 31 |
| Surfynol 440 | 0.4 | 0.52 | 0.35 | 0.5 | 0.5 | 0.5 |
| Proxel GXL | 0.02 | 0.02 | 0.02 | 0.02 | 0.02 | 0.02 |
| Rovene 4170 | 8 | 8 | 8 | | 8 | 8 |
| PU Binder 2 | | | | 8 | | |
| Water to 100 parts | | | | | | |
| Ink Properties | | | | | | |
| Viscosity at 25° C. cp | 15.1 | 15.7 | 14.26 | 15.8 | 14.18 | 12.66 |
| Viscosity at 32° C. cp | 11.82 | 12.2 | 11.04 | 12.4 | 11.02 | 10.01 |
| Surface Tension at 25° C. mN/m | 37.52 | 36.2 | 38.28 | 35.9 | 36.24 | 35.05 |
| pH | 8.66 | 8.5 | 8.61 | 8.4 | 8.53 | 8.45 |

The invention claimed is:

1. An aqueous ink comprising:
(a) from 0.1 to 8 parts by weight of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
(b) from 10 to 25 parts of a first solvent selected from one or more of the group consisting of ethylene glycol, propylene glycol, dipropylene glycol and triethylene glycol;
- (c) from 2 to 10 parts of a second solvent selected from one or more of the group consisting of 2-pyrrolidone, N-methyl-2-pyrrolidone, N-ethyl-2-pyrrolidone, N-cyclohexyl-2-pyrrolidone and N,N-dimethylacetamide;
- (d) from 20 to 45 parts of glycerol;
- (e) from 4 to 12 parts of a styrene butadiene latex binder and/or a polyurethane latex binder;
- (f) from 0.1 to 2 parts of an acetylenic surfactant;
- (g) from 0 to 2 parts of 1,2-benzisothiazolin-3-one; and
- (h) the balance to 100 parts water.

2. The ink of as claimed in claim 1 wherein the self-dispersible pigment comprises one or more of Carbon Black; Pigment Blue 15:3; Pigment Yellow 74, Pigment Yellow 155, Pigment Blue 60, Pigment Red 122 and Pigment Red 254.

3. The ink as claimed in claim 1 wherein the carboxy-functional dispersant is a copolymer comprising benzyl methacrylate and methacrylic acid.

4. The ink as claimed in claim 1 wherein the first solvent, component (b), comprises from 10 to 20 parts of triethylene glycol and/or propylene glycol.

5. The ink as claimed in claim 1 wherein the first solvent, component (b), comprises from 10 to 20 parts by weight of triethylene glycol.

6. The ink as claimed in claim 1 wherein, component (d), glycerol, is present in the range of from 24 to 34 parts by weight.

7. The ink as claimed in claim 1 wherein component (e) comprises a styrene butadiene latex binder.

8. The ink as claimed in claim 1 wherein component (e) comprises a polyurethane latex binder.

9. The ink as claimed in claim 1 wherein component (e) is present in the range of from 6 to 10 parts by weight.

10. The ink as claimed in claim 1 wherein component (f) is 2,4,7,9-tetramethyl-5-decyne-4,7-diol.

11. The ink as claimed claim 1 comprising:
- (a)i from 2 to 6 parts by weight of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
- (b)i from 12 to 20 parts by weight of triethylene glycol;
- (c)i from 3 to 7 parts by weight of 2-pyrrolidone;
- (d)i from 24 to 34 parts by weight of glycerol;
- (e)i from 6 to 10 parts by weight of a styrene butadiene latex binder;
- (f)i from 0.01 to 1.5 parts by weight of 2,4,7,9 tetramethyl-5-decyne-4,7-diol;
- (g)i from 0.005 to 0.1 parts by weight of 1,2-benzisothiazolin-3-one; and
- (h)i the balance to 100 parts by weight of water.

12. The ink as claimed claim 1 comprising:
- (a)ii from 2 to 6 parts by weight of a self-dispersible pigment which comprises a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups;
- (b)ii from 12 to 20 parts by weight of triethylene glycol;
- (c)ii from 3 to 7 parts by weight of 2-pyrrolidone;
- (d)ii from 24 to 34 parts by weight of glycerol;
- (e)ii from 6 to 10 parts by weight of a polyurethane latex binder;
- (f)ii from 0.01 to 1.5 parts by weight of 2,4,7,9 tetramethyl-5-decyne-4,7-diol;
- (g)ii from 0.005 to 0.1 parts by weight of 1,2-benzisothiazolin-3-one; and
- (h)ii the balance to 100 parts by weight of water.

13. An ink-jet printing process wherein the ink of claim 1 is printed onto a textile substrate using an ink jet printer with single-pass print-head followed by curing of the printed textile substrate.

14. A textile printed by the ink-jet printing process according to claim 13.

15. An ink-jet printer ink container containing the ink of claim 1.

16. An ink-set comprising two or more different coloured inks where at least one of the inks is the ink of claim 1.

* * * * *